United States Patent

Vosters

[11] Patent Number: 5,863,978
[45] Date of Patent: Jan. 26, 1999

[54] POLYMERS COMPOSITIONS

[75] Inventor: Philippe Vosters, Ottignies Louvain-la-Neuve, Belgium

[73] Assignee: Shell Oil Company, Houston, Tex.

[21] Appl. No.: 938,434

[22] Filed: Sep. 26, 1997

Related U.S. Application Data

[63] Continuation of Ser. No. 6,576, Jan. 21, 1993, abandoned.

[30] Foreign Application Priority Data

Feb. 13, 1992 [EP] European Pat. Off. ............ 92200411
Feb. 13, 1992 [EP] European Pat. Off. ............ 92200412

[51] Int. Cl.⁶ .............................. C08K 3/26; C08L 53/02
[52] U.S. Cl. ......................... 524/505; 524/504; 524/524; 524/525; 524/526; 524/425; 525/89; 525/95; 525/98; 525/99; 525/222; 525/228; 525/240
[58] Field of Search .................... 524/505, 524, 524/425, 504, 525, 526; 525/89, 95, 98, 99, 222, 228, 232, 240

[56] References Cited

U.S. PATENT DOCUMENTS

| | | | |
|---|---|---|---|
| 3,761,555 | 9/1973 | Wienand et al. | 264/105 |
| 4,216,131 | 8/1980 | Himes et al. | 524/505 |
| 4,350,795 | 9/1982 | Bohm et al. | 525/232 |
| 4,377,658 | 3/1983 | Collins | 524/505 |
| 4,588,777 | 5/1986 | Hotta | 525/98 |
| 4,888,145 | 12/1989 | Allner et al. | 264/126 |
| 4,923,658 | 5/1990 | Hover et al. | 264/125 |
| 5,070,143 | 12/1991 | Pucci et al. | 524/505 |

FOREIGN PATENT DOCUMENTS

| | | |
|---|---|---|
| 321760 | 12/1987 | European Pat. Off. . |
| 273516-A2 | 7/1988 | European Pat. Off. . |
| 427352-A1 | 5/1991 | European Pat. Off. . |
| 1679822 | 12/1967 | Germany . |
| 3324480 | 7/1983 | Germany . |
| 3507655 | 3/1985 | Germany . |
| 60-034682 | 8/1983 | Japan . |
| 1341922 | 12/1973 | United Kingdom . |

*Primary Examiner*—James J. Seidleck
*Assistant Examiner*—Olga Asinovsky
*Attorney, Agent, or Firm*—Donald F. Haas

[57] ABSTRACT

Improved polyvinylchloride-free compositions useful for wall and floor coverings comprise an optionally functionalized, ethylenically unsaturated block copolymer of monoalkenyl aromatic hydrocarbon and conjugated alkadiene, or selectively hydrogenated derivative thereof, an ethylene polymer, functionalized polyalkylene, polyisobutylene and particulate filler.

19 Claims, No Drawings

POLYMERS COMPOSITIONS

This is a continuation of application Ser. No. 08/006,576 filed Jan. 21, 1993 now is abandoned.

FIELD OF THE INVENTION

This invention relates to block copolymer-based compositions, free of polyvinylchloride, which are useful as wall or floor coverings.

BACKGROUND OF THE INVENTION

Plasticized compositions based on polyvinylchloride (PVC) are widely used in the floor-covering industry because of the properties of high scratch resistance and smooth surface finish which such compositions provide. These PVC-containing compositions are well known in the art, being disclosed for example in U.S. Pat. No. 3,761,555, U.S. Pat. No. 4,888,145 and U.S. Pat. No. 4,923,658. However, the PVC-containing compositions have the substantial disadvantage of releasing hydrogen chloride and possibly other toxic chemicals when burned. As environmental regulations become more restrictive and the need for recycling becomes more significant, alternatives to PVC-based compositions become more desirable.

These alternate compositions must demonstrate the good surface properties of the PVC-based compositions to be acceptable to industry and should be able to be calendared with the same equipment used for PVC compositions. One example of a PVC-free formulation for floor and wall coverings is disclosed by European Patent Application 321760. The formulation is a homogeneous synthetic material comprising (1) an ethylene-vinyl acetate copolymer optionally employed with propylene with minor amounts of ethylene-propylene-diene monomer terpolymer and polyethylene, (2) a filler material, (3) a coloring agent and optionally (4) minor amounts of conventional additives. These formulations suffer from stiffness and the poor processability and the high density thereof restricts the application of the formulations as wall coverings.

A second PVC-free composition is disclosed by Japanese Patent Application No. 60-034682. The composition, useful for floor coverings, is prepared by adding a minor amount of a homopolymer or copolymer of isobutylene to a crosslinkable rubber and/or a thermoplastic rubbery polymer. The blend is subsequently vulcanized through use of a crosslinking agent. The composition is in the form of a three-dimensional network and floor material prepared from the composition is hard and difficult to process.

It would be of advantage to have polymer compositions not based on polyvinylchloride which demonstrate low density and good processability and the scratch resistance and good surface appearance properties of PVC-based compositions, but which are environmentally more acceptable.

SUMMARY OF THE INVENTION

The present invention provides block copolymer-based compositions of good processability and relatively low density which are useful as wall and floor coverings with good surface appearance and good scratch resistance. The compositions comprise (1) optionally functionalized, linear or star-shaped block copolymer of monoalkenyl aromatic hydrocarbon and conjugated alkadiene, or selectively hydrogenated derivatives thereof, of at least three blocks, (2) ethylene polymer, (3) functionalized polyalkylene, (4) polyisobutylene and (5) particulate filler.

DETAILED DESCRIPTION OF THE INVENTION

The block copolymer useful as a component of the compositions of the invention is a linear or star-shaped block copolymer of at least one block of at least predominantly polymerized monoalkenyl aromatic hydrocarbon and at least one block of at least predominantly polarized conjugated alkadiene, or selectively hydrogenated derivative thereof, either block copolymer optionally functionalized with other functional groups.

The monoalkenyl aromatic hydrocarbon precursor of such block copolymer is styrene or substituted styrene of up to 12 carbon atoms inclusive. Illustrative of such monoalkenyl aromatic hydrocarbons are styrene, p-methylstyrene, p-ethylstyrene, m-isopropylstyrene, p-hexylstyrene, α-methylstyrene and α,4-dimethylstyrene. Of these monoalkenyl aromatic hydrocarbons, styrene and α-methylstyrene are preferred, especially styrene.

The conjugated alkadiene monomer of the block copolymer component is a 1,3-alkadiene of up to 8 carbon atoms inclusive such as 1,3-butadiene (butadiene), 2-methyl-1,3-butadiene (isoprene), 1,3-pentadiene, 2-methyl-1,3-hexadiene and 1,3-octadiene. Of the conjugated alkadienes, butadiene and isoprene are preferred, especially butadiene. The production of block copolymer of monoalkenyl aromatic hydrocarbon and conjugated alkadiene is well known and conventional in the art as are methods for controlling the molecular weight of the blocks, the configuration of the polymerized alkadiene block and the overall configuration of the block copolymer.

In one modification, a linear block copolymer is produced as by sequential polymerization of the blocks. By way of example, a block of polymerized monoalkenyl aromatic hydrocarbon is produced in the presence of a polymerization initiator which is typically an alkyllithium compound of up to 4 carbon atoms, e.g., butyllithium. The result is a lithium-capped "living" polymer of the monoalkenyl aromatic hydrocarbon. Although a mixture of monoalkenyl aromatic hydrocarbons is suitably used to prepare a mixed block, it is generally preferred to employ only a single monoalkenyl aromatic hydrocarbon. To the lithium-capped polymer is provided conjugated alkadiene to "grow" a block of polymerized conjugated alkadiene on the initial block of polymerized monoalkenyl aromatic hydrocarbon. Substantially complete polymerization of the monoalkenyl aromatic hydrocarbon before the polymerization of conjugated alkadiene results in the production of rather discrete blocks. Alternatively, provision of conjugated alkadiene prior to complete polymerization of the monoalkenyl aromatic hydrocarbon results in a mixture of monomers at the interface between the two blocks in a type of polymer termed "tapered", which is satisfactory but less preferred.

Within the production of polymerized conjugated alkadiene two types of polymerization are possible. In what is termed 1,2-polymerization, one carbon-carbon double bond of the conjugated alkadiene is involved in the formation of the polymer chain which then has pendant ethylenically unsaturated groups. In what is termed 1,4-polymerization, both carbon-carbon double bonds are involved in the formation of the polymeric chain which then includes ethylenic unsaturation. Control of these polymerization types is well understood in this art.

The product of the conjugated alkadiene polymerization is contacted, for example, with additional monoalkenyl aromatic hydrocarbon to grow a second block of polymerized monoalkenyl aromatic hydrocarbon and produce a living polymer of these three blocks. Additional blocks are introduced, if desired, by continuing the sequence. Subsequently, the living three-block or triblock polymer is contacted with an active hydrogen compound such as an acid or an alcohol to "kill" the living polymer and thereby terminate polymerization. Other conventional terminating agents are also useful. In an alternate production of triblock polymer, the living polymer of two blocks is contacted with a difunctional coupling agent such as ethylene dibromide to produce the linear triblock polymer. Use of coupling agents of higher functionality produces block copolymers of non-linear configuration. For example, the use of a polyvinylaromatic coupling agent, e.g., divinylbenzene, results in block copolymers of a "star" configuration.

The structure and chemical nature of the block copolymers is described by a conventional form of nomenclature. A monoalkenyl aromatic hydrocarbon block is broadly termed an "A" block and more specifically is termed an "S" block if produced from styrene. A conjugated alkadiene block is broadly termed a "B" block. This term also applies to a block specifically formed from butadiene and a block produced by polymerization of isoprene is termed an "I" block. Thus, a linear triblock polymer of two blocks of polymerized monoalkenyl aromatic hydrocarbon and one block of polymerized conjugated alkadiene is broadly termed ABA or, if prepared from styrene and butadiene, an SBS polymer. Sequential polymerization of these monomers in reverse order would lead to a BAB (or BSB) triblock polymer.

In the compositions of the invention, the ethylenically unsaturated block copolymers initially formed are preferably linear triblock polymers such as SBS or SIS, or are star block copolymers conventionally identified as $(SB)_n$ or $(SI)_n$ wherein n is the number of "arms" on the star. The polymers are further characterized by a number average molecular weight of from about 3000 to about 40,000 for each block of polymerized monoalkenyl aromatic hydrocarbon and a number average molecular weight of from about 20,000 to about 100,000 for each block of polymerized conjugated alkadiene. The block copolymers suitably have a polymerized monoalkenyl aromatic hydrocarbon content of from about 10% by weight to about 70% by weight based on total block copolymer. These block copolymers are conventional and a number are commercial being marketed as KRATON® Thermoplastic Rubber by Shell Oil Company and as CARIFLEX Thermoplastic Rubber by Shell Chemical Company, Ltd. The commercially available CARIFLEX TR-1101, TR-1102 or TR-1107 are particularly useful in the compositions.

Also suitable in the compositions of the invention are the selectively hydrogenated derivatives of the initially-produced ethylenically unsaturated block copolymers described above. It is well known that such polymers are hydrogenated under conditions which will serve to hydrogenate from about 80% to about 99% of the aliphatic unsaturation present in the block copolymer while hydrogenating no more than 25% and preferably no more than 5% of the aromatic unsaturation of the polymer molecule. Conditions to effect such hydrogenation including the choice of a hydrogenation catalyst are conventional and are well understood in the art. The resulting selectively hydrogenated block copolymers are conventionally identified by the "apparent" structure of the aliphatic block. Thus, selective hydrogenation of an SBS polymer will result in the production of a polymer having a midblock which is apparently polyethylene in the case of a B block produced by 1,4-polymerization and an apparent ethylene/butylene copolymer in the case of a B block produced by predominantly 1,2-polymerization. These selectively hydrogenated block copolymers are conventionally designated SES and SEBS, respectively. The polymer produced by selective hydrogenation of an SIS block copolymer wherein the I block has a high degree of 1,4-polymerization is termed an SEPS polymer because of the similarity of the hydrogenated midblock to an ethylene/propylene copolymer. Similar nomenclature applies to block copolymers having more than three blocks or to polymers having a configuration other than linear. For example, selective hydrogenation of a star $(SI)_n$ polymer results in the formulation of an $(SEP)_n$ polymer wherein n has the previously stated meaning. Such nomenclature is conventional and well understood in the art.

The selectively hydrogenated block copolymers of monoalkenyl aromatic hydrocarbon and conjugated alkadiene are conventional and a number are commercial, being marked as KRATON® Thermoplastic Rubber. The polymers commercially available as KRATON G-1650, KRATON G-1651 and KRATON G-1652 are particularly useful.

Also suitable as the block copolymer component of the compositions of the invention are functionalized derivatives of the above-described ethylenically unsaturated or selectively hydrogenated block copolymers wherein the functional groups introduced into the block copolymer molecule are hydroxyl, epoxy, carboxyl or carboxylic acid anhydride. The introduction of such groups by further reaction of the initially produced block copolymers is conventional and well known in the art. Of the functionalized block copolymers, the preferred polymers contain carboxyl functional groups illustratively produced by reaction of the initially produced, non-functionalized block copolymer with acrylic acid, methacrylic acid or maleic acid.

The second component of the compositions of the invention is an ethylene polymer component selected from polyethylene or ethylene-propylene copolymer. This component appears to contribute favorably to the processability as well as providing hardness to the resulting composition. Suitable ethylene polymer components have a melt index from about 5 dg/min to about 25 dg/min, as measured under a load of 2.16 kg at 230° C. for ethylene homopolymer or 180° C. for the ethylene-propylene copolymer. The ethylene polymer component is present in the compositions in an amount of from about 150 parts per weight to about 250 parts per weight per 100 parts by weight of block copolymer component. The preferred ethylene polymer components are high density polyethylene such as HPDE 6201 marketed by Exxon or ethylene-propylene copolymer such as PP HER6300 marketed by Shell Chemical Company, Ltd. The ethylene-propylene copolymers are especially preferred.

A third component of the compositions of the invention is a functionalized polyalkylene wherein the alkylene has up to 8 carbon atoms inclusive. By "functionalized polyalkylene" is meant a polymer having a polyalkylene backbone to which functional groups are attached. The preferred functionalized polyalkylene is a functionalized polyethylene with ester functional groups such as an ethylene-vinyl acetate copolymer or an ethylene-ethyl acrylate copolymer. The ethylene-vinyl acetate copolymers are well known and conventional and a number are commercial, being marketed under the ESCORENE and RIBLENE marks. The functionalized polyalkylene is utilized i an amount from about 300 parts by weight to about 900 parts by weight per 100 parts by weight of block copolymer. Preferred compositions contain functionalized polyalkylene in an amount from about 450 parts by weight to about 800 parts by weight per 100 parts by weight of block copolymer.

A fourth component of the compositions of the invention is a polyisobutylene polymer. This component is considered to be largely responsible for the surface appearance of the composition and to provide elasticity to the composition. Suitable polyisobutylenes have an average viscosity molecular weight from about 40,000 to about 5,000,000. Preferred polyisobutylene polymers have an average viscosity molecular weight from about 1,000,000 to about 3,500,000. The polyisobutylene polymer is provided to the compositions of the invention in a quantity of from about 10 parts by weight to about 100 parts by weight of block copolymer. Preferred compositions contain from about 20 parts by weight to about 80 parts by weight of polyisobutylene polymer per 100 parts by weight of block copolymer. Such polyisobutylene polymers are conventional and a number are commercial, being marketed under the mark OPPANOL.

A fifth component of the compositions of the invention is a particulate filler, either organic or inorganic. Such fillers are well known and include calcium carbonate, talc, clay, kaolin, mica, barytes, silica, bentonite, barium sulfate, magnesium hydroxide and cork powder as well as mixtures thereof. Of these fillers, calcium carbonate is preferred. A number of commercial calcium carbonate fillers are available including those marketed under the OMIYA, JURAPERLE and CALCILIT marks. The filler is suitably present in an amount from about 100 parts by weight to about 1500 parts by weight per 100 parts by weight block copolymer. Preferred compositions incorporate the particulate filler in an amount of from about 700 parts by weight to about 1200 parts by weight per 100 parts by weight block copolymer.

It is useful, on occasion, to incorporate within the compositions of the invention relatively minor amounts of conventional additives such as antioxidants, stabilizers, coloring agents and fire retardant chemicals. Preferred embodiments of the invention contain IRGANOX® 565 or IRGANOX® 1010 as antioxidant and TINUVIN® P or TINUVIN® 770 as stabilizer. No additive is required for the compositions of the invention but amounts of such additives up to about 50 parts by weight per 100 parts by weight of block copolymer. When additives are present, compositions containing from about 1 part by weight to about 20 parts by weight per 100 parts by weight of block copolymer are preferred.

The compositions of the invention are produced by methods well known in the art for preparing intimate mixtures of polymeric materials. Such methods are illustrated by the procedures disclosed in U.S. Pat. No. 3,761,555, U.S. Pat. No. 4,888,145 and U.S. Pat. No. 4,923,658. A preferred method of producing the compositions comprises the mixing of the components in appropriate proportions in a mixing device operating at high shear, e.g., a Banburry mixer, and at an elevated temperature as from about 180° C. to about 200° C. The blend thereby obtained is calendared as by rolling the blend in a Calander roller for use as a wall or floor covering. The compositions of the invention have good processability and a relatively low density and exhibit good surface appearance and scratch resistance when provided in calendared form. The compositions are recyclable and emit no hydrogen chloride or other toxic material when burned.

The invention is further illustrated by the following Comparative Examples (not of the invention) and the following Illustrative Embodiments which should not be regarded as limiting.

ILLUSTRATIVE EMBODIMENT I

A composition of the invention (composition I) was prepared by charging the components thereof to a Banburry Mixer which had been preheated to 100° C. The components were then mixed at a temperature between 180° C. and 200° C. The resulting composition was calendared to provide a sheet having a thickness of 1.65 mm. The components, the proportions thereof and certain properties of the sheets are provided in Table I.

ILLUSTRATIVE EMBODIMENT II

Comparative Examples A–C

By the procedure of Illustrative Embodiment I, a composition of the invention (composition II) and comparative compositions A–C were produced and were calendared to give a sheet having a thickness of 1.55. The composition of each formulation is provided in Table I.

Also provided in Table I are the scratch resistance and surface appearance of each sheet. The evaluation was qualitative in which +++ signifies very good, ++ signifies good, + signifies poor, − signifies very poor and −− and −−− signify bad and very bad, respectively.

In Table I, CARIFLEX TR-1102 is a linear block copolymer of the SBS type available from Shell Chemical Co., Ltd. CARIFLEX TR-4113 is an oil-extended linear block copolymer of the SBS type available from Shell Chemical Co., Ltd. Shell PS 2000N as a polystyrene grade available from Shell Chemical Co., Ltd. and SHELLFLEX® 4510 is an aromatic oil available from Shell Petroleum Co., Ltd. OPPANOL B150 is a polyisobutylene of an average viscosity molecular weight of 2,800,000 (equivalent to a weight average molecular weight of 1,752,000).

TABLE I

| Composition | I | II | A | B | C |
|---|---|---|---|---|---|
| TR-1102 | 100 | 100 |  | 100 | 100 |
| TR-4113 |  |  | 100 |  |  |
| PS 2000N |  |  | 67 |  |  |
| PP KY6100 |  |  |  | 67 |  |
| PP HER6300 | 200 |  |  |  | 200 |
| HDPE 6201 |  | 200 |  |  |  |
| EVA UL00119 | 650 | 650 |  |  | 650 |
| SHELLFLEX 4510 |  |  | 8.3 | 8.3 | 50 |
| OPPANOL B150 | 50 | 50 |  |  |  |
| OMIYA 200 | 1000 | 1000 | 83 | 83 | 1000 |
| IRGANOX 565 | 1 | 1 | 0.17 | 0.17 | 1 |
| TINUVIN P | 3 | 3 | 0.5 | 0.5 | 3 |
| Surface Appearance | +++ | ++ | −− | −− | −− |
| Scratch Resistance | ++ | ++ | −−− | −−− | + |

ILLUSTRATIVE EMBODIMENT III

The compositions of Illustrative Embodiments I and II were compared with MIPOLAM 900, a commercially available PVC-free floor covering formulation. The properties of the two compositions and of MIPOLAM 900 are compared in Table II. The Tensile Strength at yield and break, as well as Elongation at break and Tensile Modulus were measured according to test standard DIN 53128 and L&W Stiffness by DIN 53121.

TABLE II

| Property | Composition I | Composition II | Mipolam 900 |
|---|---|---|---|
| Thickness (mm) | 1.65 | 1.55 | 2.08 |
| Weight (g/m$^2$) | 2359 | 2160 | 3391 |
| Density (g/m$^3$) | 1.42 | 1.39 | 1.63 |

TABLE II-continued

| Property | Composition I | Composition II | Mipolam 900 |
|---|---|---|---|
| Tensile Strength at Yield (N/cm) | 74 | 81 | 114 |
| Tensile strength at Break (N/cm) | 111 | 104 | 176 |
| Elongation at Break (%) | 24 | 21 | 20 |
| Tensile Modulus (N/cm$^2$) | 18 | 13 | 18 |
| Tear Strength (gf) | >6400 | >6400 | >6400 |
| L & W Stiffness: | | | |
| Bending Force at 15° bend (Nm) | 370 | 430 | 716 |
| Modulus (MN/m$^2$) | 166 | 255 | 152 |

The data of Table II show that the compositions of the invention are improvements over the properties of MIPO-LAM 900 in some instances and comparable in most others.

What is claimed is:

1. A composition useful in wall and floor covering consisting essentially of:
   (a) an optionally functionalized block copolymer of at least three blocks selected from linear or star block copolymer of monoalkenyl aromatic hydrocarbon and conjugated alkadiene or selectively hydrogenated derivative thereof;
   (b) ethylene polymer selected from polyethylene and ethylenepropylene copolymer;
   (c) functionalized polyalkylene wherein the alkylene has up to 8 carbon atoms inclusive;
   (d) polyisobutylene; and
   (e) particulate filler.

2. The composition of claim 1 wherein the block copolymer is linear block copolymer or selectively hydrogenated derivative thereof.

3. The composition of claim 2 wherein the block copolymer is linear triblock copolymer.

4. The composition of claim 3 wherein the ethylene polymer is ethylene-propylene copolymer present in an amount from about 150 parts by weight to about 250 parts by weight per 100 parts by weight of block copolymer.

5. The composition of claim 4 wherein the functionalized polyalkylene is a functionalized polyethylene.

6. The composition of claim 5 wherein the polyisobutylene is present in a quantity of from about 10 parts by weight to about 100 parts by weight per 100 parts by weight of block copolymer.

7. The composition of claim 6 wherein the functionalized polyethylene is ethylene-vinyl acetate copolymer or ethylene-ethyl acrylate copolymer present in an amount from about 300 parts by weight to about 900 parts by weight per 100 parts by weight of block copolymer.

8. The composition of claim 7 wherein the filler is calcium carbonate present in an amount from about 100 parts by weight to about 1500 parts by weight per 100 parts by weight of block copolymer.

9. The composition of claim 2 wherein the block copolymer is a selectively hydrogenated linear triblock copolymer.

10. The composition of claim 9 wherein the ethylene polymer is ethylene-propylene copolymer present in an amount from about 150 parts by weight to about 250 parts by weight per 100 parts by weight of block copolymer.

11. The composition of claim 10 wherein the functionalized polyalkylene is ethylene-vinyl acetate copolymer or ethylene-ethyl acrylate copolymer present in an amount from about 300 parts by weight to about 900 parts by weight per 100 parts by weight of block copolymer.

12. The composition of claim 11 wherein the polyisobutylene is present in an amount from about 10 parts by weight to about 100 parts by weight per 100 parts by weight of block copolymer.

13. The composition of claim 12 wherein the filler is calcium carbonate, present in an amount from about 100 parts by weight to about 1500 parts by weight per 100 parts by weight of block copolymer.

14. A composition useful in wall and floor covering comprising:
   (a) an optionally functionalized linear triblock copolymer of monoalkenyl aromatic hydrocarbon and conjugated alkadiene or selectively hydrogenated derivative thereof;
   (b) ethylene-propylene copolymer present in an amount from about 150 parts by weight to about 250 parts by weight per 100 parts by weight of the triblock copolymer;
   (c) functionalized polyethylene;
   (d) polyisobutylene present in a quantity of from about 10 parts by weight to about 100 parts by weight per 100 parts by weight of the triblock copolymer; and
   (e) particulate filler.

15. The composition of claim 14 wherein the functionalized polyethylene is ethylene-vinyl acetate copolymer or ethylene-ethyl acrylate copolymer present in an amount from about 300 parts by weight to about 900 parts by weight per 100 parts by weight of the triblock copolymer.

16. The composition of claim 15 wherein the filler is calcium carbonate present in an amount from about 100 parts by weight to about 1500 parts by weight per 100 parts by weight of the triblock copolymer.

17. A composition useful in wall and floor covering comprising:
   (a) an optionally functionalized, selectively hydrogenated linear triblock copolymer of monoalkenyl aromatic hydrocarbon and conjugated alkadiene;
   (b) ethylene-propylene copolymer present in an amount from about 150 parts by weight to about 250 parts by weight per 100 parts by weight of the triblock copolymer;
   (c) ethylene-vinyl acetate copolymer or ethylene-ethyl acrylate copolymer present in the amount from about 300 parts by weight to about 900 parts by weight per 100 parts by weight of the triblock copolymer;
   (d) polyisobutylene; and
   (e) particulate filler.

18. The composition of claim 17 wherein the polyisobutylene is present in an amount from about 10 parts by weight to about 100 parts by weight per 100 parts by weight of the triblock copolymer.

19. The composition of claim 18 wherein the filler is calcium carbonate, present in an amount from about 100 parts by weight to about 1500 parts by weight per 100 parts by weight of the triblock copolymer.

* * * * *